Figure 1:
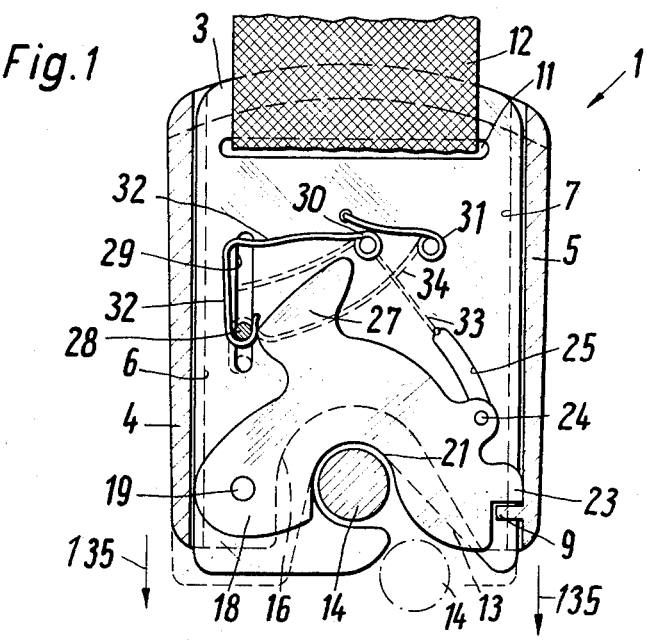

United States Patent
Ockel

[15] 3,668,747
[45] June 13, 1972

[54] SNAPLOCK FOR SAFETY BELTS

[72] Inventor: Gustav Ockel, Norderstedt, Germany

[73] Assignee: Firma Klippan GmbH, Kohfurth, Germany

[22] Filed: Dec. 3, 1970

[21] Appl. No.: 94,678

[30] Foreign Application Priority Data

Dec. 8, 1969 France.................................6942338

[52] U.S. Cl............................................24/241, 24/230 AS
[51] Int. Cl......................................A44b 13/00, A44b 19/00
[58] Field of Search................24/230 AP, 230 AV, 230 AS, 24/233

[56] References Cited

UNITED STATES PATENTS

3,378,301  4/1968  Romanzi et al. ................24/230 AU

FOREIGN PATENTS OR APPLICATIONS

1,096,699  12/1967  Great Britain ....................24/230 AU
236,818   3/1964   Germany...........................24/230 AP
693,433   8/1965   Italy..................................24/230 AS Primary Examiner—Paul R. Gilliam
Attorney—Allison C. Collard

[57] ABSTRACT

A snap or clip-on lock for safety belts particularly suitable for motor vehicles which is capable of being clipped onto a bow or a hoop locked to the vehicle body consisting of a movable lock housing and a locking plate slidably disposed in the housing and including a recess for receiving the bow. The locking plate also includes one or more arresting hooks on the sides of the plate, the arresting hooks being pivotably mounted against the plate and including a spring urging the arresting hooks into their locking position. The lock housing includes an abutment which prevents pivoting of the arresting hooks into a release position while the arresting hooks are locked to the bow.

8 Claims, 2 Drawing Figures

Inventor:
Gustav Ockel
By [signature]
Attorney

SNAPLOCK FOR SAFETY BELTS

This invention relates to a snap or clip-on lock for safety belts and particularly for safety belts in motor vehicles. The lock is clipped onto a bow which is either permanently fixed to the bottom of the vehicle, or inserted into another lock portion.

More specifically, the present invention relates to a safety belt lock having a locking plate which is movably arranged within the locking housing.

In conventional devices, the locking plate has a recess for the bow and carries an arresting hook on one or on both sides as seen in W. German Pat. No. 1,247,149. In these conventional devices, the arresting hooks are pivotably mounted for movement from a locking position into a releasing position against the force of a spring. This pivotable movement is actuated by clipping a lock onto a bow when the locking plate is pressed against the bow together with the housing, until the bow engages the recess, and the arresting hooks can be pivoted back into the locking position. The force of the spring holds the arresting hooks in their locked position. To release the safety belt from its locked position, only the housing has to be pulled. This causes the housing to be displaced with respect to the locking plate and the arresting hooks to pivot into the release position, so that the lock can be removed from the bow.

The proper functioning of these known clip-on locks assumes that the safety belt corresponds to the practical requirements of the passengers without having too much of a belt loop. In other words, in case of an accident, the safety belt should react to stress. A large belt loop is understood to be a belt loop wherein the distance between the belt and the chest of the passenger is relatively large when the passenger leans back in his seat. However, if the lock, and particularly the locking plate and arresting hooks react to torsion, it is possible that the arresting hooks will be pressed into the release position by the bow. However, this type of torsion stress can only happen if the passenger is careless and leaves the belt loop in a very loose position so that the lock, together with the bow, engages the bottom of the vehicle floor in an almost flat engagement therewith. In other words, a torsion stress is created only when the safety belt has too much of a belt loop, a situation which does not provide the required safety for the passenger. It is to be noted that in such a situation, the passenger would fall into the safety belt with full speed if the vehicle came to a sudden standstill during an accident. It is also possible that the passenger might retract his seat for convenience and thereby create a larger belt loop. If in this case, the vehicle is involved in an accident, the lock would also be subjected to a high degree of torsional stress.

Accordingly, the present invention provides a lock for a safety belt which cannot be pushed into a release position when torsional stress is applied to the locking plate and the arresting hooks. This feature is achieved by providing a lock with an abutment which prevents pivoting of the arresting hook in the lock while the lock is in its locked position. The abutment is preferably mounted on the movable housing so that when the housing is displaced with respect to the locking plate, the arresting hooks are automatically released when the lock housing is pulled. The abutment may be in form of a pin which extends through an elongated opening in the locking plate.

In order to simplify the release of the arresting hooks, it has been shown that when the locking plate is pushed against the force of a spring in the housing, to a certain extent, the arresting hook can be pivoted into a release position without being hindered by the abutment. Therefore, the locking plate with its associated arresting hooks may have three different positions with respect to the housing. In the first position, in which the bow is held in its arrested position during driving, the locking plate is in its center position and the arresting hooks are in the locked position and are secured in that position by the abutment against accidental pivoting and release.

In the second position, which is referred to as the "clip-on position," the housing is displaced more over the locking plate as is done when the lock is clipped onto a bow. In this position, the abutment is not in engagement with the arresting hooks so that the hooks can freely pivot into the release position and back into the locking position. In the third position, called the "open position," the locking plate is pulled out of the housing. When the locking plate is pulled from the housing, which is affected by pulling on the housing, the arresting hooks are released from the abutment so that they can pivot into the open position. Thus, a pull at the housing releases the lock from the bow. By providing springs, there is positive functioning of the movement of the individual parts with respect to each other.

It is therefore an object according to the present invention to provide a snap lock particularly suitable for motor vehicles which does not accidentally release itself when the lock is twisted while under tensional force.

It is another object according to the present invention to provide a snap or clip-on lock for safety belts which is simple in design, easy to manufacture and reliable in operation.

Other objects and features of the present invention will become apparent from the following detailed description considered in connection with the accompanying drawing which discloses the embodiments of the invention. It is to be understood, however, that the drawing is designed for the purpose of illustration only and not as a definition of the limits of the invention.

Figure 2:
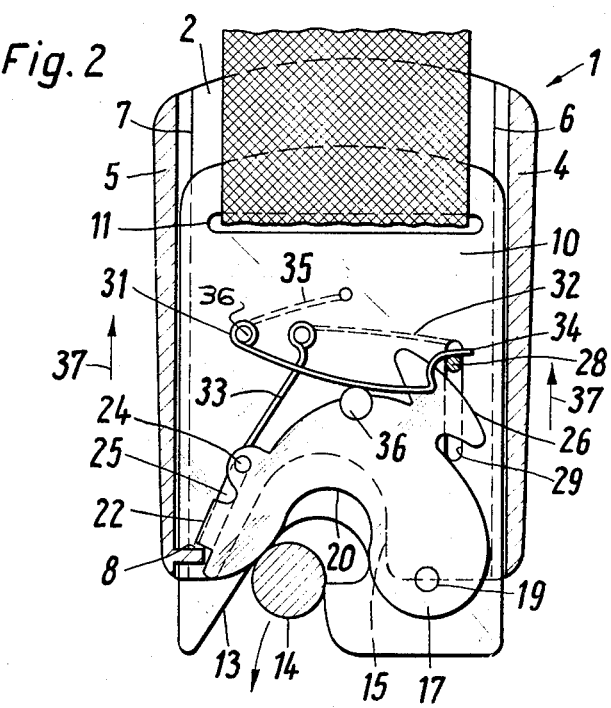

In the drawing, wherein similar reference characters denote similar elements throughout the several views:

FIG. 1 is a front view of a safety belt lock in its locked position, partly in cross-section; and, FIG. 2 shows a rear view of the same safety belt lock in its open position, partly in cross-section.

The clip-on lock in FIGS. 1 and 2 comprises a box-like housing 1 which is open at its upper and lower portion, and includes a front face 2, a back side 3, and sidewalls 4 and 5 respectively. Longitudinal grooves 6 and 7 are provided in sidewalls 4 and 5 respectively. At the two end sections of sidewall 5 are provided two protruding webs 8 and 9, and serve as limit stops. A locking plate 10 is slidably guided with respect to the housing in grooves 6 and 7 of housing 1. At its upper portion, locking plate 10 is provided with an elongated slot 11. A safety belt 12 engages slot 11. The opposite end of locking plate 10 is provided with a recess 13 extending obliquely from the side of the locking plate to the center thereof. Recess 13 is sufficiently large to receive a loop 14 which is permanently installed at the bottom of a vehicle. On the other hand, recess 13 is smaller than recesses 15 and 16 located at front wall 2 and rear wall 3 of housing 1.

Locking plate 10 carries on each side, arresting hooks 17 and 18, respectively. Both arresting hooks are pivotably mounted on a bearing pin 19, which is mounted on a locking plate 10. On the lower portion, the arresting hooks are provided with recesses 20 and 21 respectively. The recesses are such that the edge of the recesses coincide with the edge of recess 13, when locking plate 10, together with arresting hooks 17 and 18, are in a locked position. Arresting hooks 17 and 18 are provided with projections 22 and 23 respectively which are located at the face of the arresting hooks, away from bearing pin 19. Projections 22 and 23 engage webs 8 and 9 of the housing. Above projections 22 and 23, arresting hooks 17 and 18 are provided with a pin 24 which is guided within an arc-like longitudinal slot 25, provided in locking plate 10. Arresting hooks 17 and 18 also each carry a radially protruding shoulder 26 and 27 respectively. An abutment 28 cooperates with shoulder 26 and 27. Abutment 28 is a pin which is mounted in the front side 2 and back side 3 of housing 1 and extends through an elongated hole 29 of locking plate 10. The elongated hole 29 extends parallel with respect to the side edges of locking plate 10, so that it can be moved to housing 1, while simultaneously displacing the abutment 28, within the elongated opening 29.

To insure proper functioning of the movement of the individual parts, two springs 30 and 31 are provided. The first spring 30 with its leg 32 encompasses abutment 28 from below. Leg 32 is U-shaped on its bottom portion. Spring 30 extends into the longitudinal slot 25 with its second leg 33. Longitudinal slot 25 thus serves as an abutment for spring 30. The second spring 31 encompasses abutment 28 from above with leg 34, and extends into an opening 36 in locking plate 10 with its opposite leg 35. Thus, the following action is obtained: Normally, the clip-on lock is in the locked position which is shown in solid lines in FIG. 1. In this position, a hoop or bow 14 is encompassed by the edge of recess 13, and the edge of recesses 20 and 21 of the arresting hooks, so that the hook cannot be pulled off when the safety belt 12 exerts a pull on locking plate 10. In this position, arresting hooks 17 and 18 engage abutment 28 with their two protrusions 26 and 27. Therefore, in this position, they cannot be pivoted into an open position. Furthermore, the lock will not open even under torsional stress exerted on the locking plate 10 and arresting hooks 17 and 18. In order to clip the lock onto a hoop or bow 14, the bow 14 is brought into an engaging position with locking plate 10 and the two arresting hooks 17 and 18. Thereafter, housing 1 is pressed downwardly as shown with arrows 135. Housing 1 then moves relative with respect to locking plate 10 and takes a position as shown in the dotted lines in FIG. 1. During this relative movement, abutment 28 travels downwardly in elongated opening 29. Leg 32 of spring 30 is thus deflected downwardly so that this movement is against the force of spring 30. Due to the displacement of abutment 28 to shoulders 26 and 27 of arresting hooks 17 and 18, the arresting hooks are freed, so that bow 14, by pivoting arresting hooks 17 and 18 around bearing pin 19, is introduced into recesses 13, 20 and 21 to an extent that arresting hooks 17 and 18 return into a locking or arresting position.

The pivoting movement of arresting hooks 17 and 18, which are actuated by the pressure of bow 14, acts against the force of spring 31, or by disengaging spring leg 34 respectively from shoulder 36 of arresting hook 17. Spring leg 34 also forces the two arresting hooks 17 and 18 back into the locking position as soon as bow 14 is pushed into recess 13 to an extent that arresting hooks 17 and 18 can encompass bow 14 with their recesses 20 and 21.

To open the hook, the housing has to be pulled in the direction of arrows 37, as shown in FIG. 2. By pulling the housing 1 in this direction, locking plate 10 is displaced with respect to the housing, so that locking plate 10 is pulled out of housing 1, as shown in FIG. 2. This type of displacement again acts against the force of spring 31, whereby abutment 28 is encompassed by leg 34. During this displacement of housing 1, arresting hooks 17 and 18 are also displaced, because they engage shoulders 8 and 9 of housing 1 with their associated protrusions 22 and 23. By pulling housing 1 upwardly, arresting hooks 17 and 18 are pivoted into their release position, so that the entire lock can be removed from bow 14, as shown in FIG. 2.

While only a few embodiments of the present invention have been shown and described, it is obvious that many changes and modifications may be made thereunto without departing from the spirit and scope of the invention.

What is claimed is:

1. A snap lock for safety belts particularly suitable for motor vehicles having a release and locking position so that the lock can be clipped onto a bow comprising:
   a lock housing,
   a locking plate which is movable within said lock housing, said plate including a recess for receiving the bow,
   at least one arresting hook disposed on at least one side of said locking plate,
   an abutment means interconnected with said lock housing, said at least one arresting hook and said locking plate to prevent said at least one arresting hook from pivoting into the release position while the hook is in the locking position on the locking plate, and
   spring means aperably connected to said lock housing and said at least one arresting hook, and urged against said at least one arresting hook so that said at least one hook is pivoted from the locking position into the release position against the force of said spring means by pulling the locking plate out of the lock housing.

2. The snap lock as recited in claim 1, wherein said abutment is mounted on said lock housing.

3. The snap lock as recited in claim 2, wherein said locking plate includes an elongated opening and said abutment comprises a pin disposed through said elongated opening in said locking plate.

4. The snap lock as recited in claim 3, wherein said locking plate is movable and springloaded in said housing so as to allow said at least one arresting hook to be pivoted into its release position and disengaged from said pin.

5. The snap lock as recited in claim 4, wherein said pin is a spring support for said springloaded locking plate, said locking plate being releasable by said moving said plate in the direction of said housing against the force of the springloading.

6. The snap lock as recited in claim 5, wherein said at least one arresting hook additionally comprises at least one shoulder for engaging said pin when said at least one arresting hook is in a locking position.

7. The snap lock as recited in claim 2, wherein said at least one arresting hook additionally comprises at least one shoulder for engaging said abutment when said at least one arresting hook is in a locking position.

8. A snap lock as recited in claim 1 including a plurality of arresting hooks.

* * * * *